MONOSTABLE MULTIVIBRATOR UTILIZING UNIDIRECTIONAL DEVICE IN CROSS-COUPLING TO ISOLATE OUTPUT FROM INPUT DURING QUIESCENT CONDITION

Original Filed Sept. 7, 1961

INVENTOR
FRED L. ROGERS Jr.

BY Karl A. Ohralik

ATTORNEY.

United States Patent Office 3,226,576

Patented Dec. 28, 1965

3,226,576

MONOSTABLE MULTIVIBRATOR UTILIZING UNIDIRECTIONAL DEVICE IN CROSS-COUPLING TO ISOLATE OUTPUT FROM INPUT DURING QUIESCENT CONDITION

Fred L. Rogers, Jr., Lexington, Ky., assignor to International Business Machines Corporation, Armonk, N.Y., a corporation of New York Continuation of application Ser. No. 136,473, Sept. 7, 1961. This application Nov. 18, 1964, Ser. No. 415,846
4 Claims. (Cl. 307—88.5)

Figure 1:
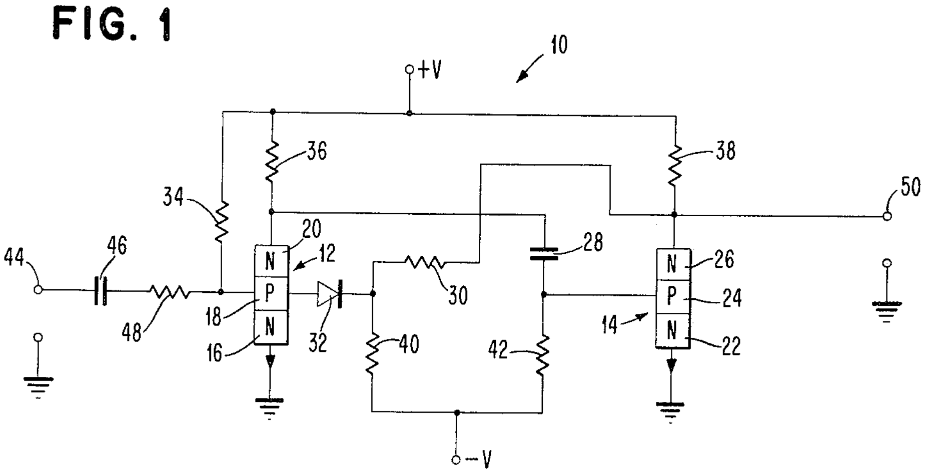

This is a continuation of application Serial No. 136,473, filed September 7, 1961, now abandoned.

This invention relates to an electrical amplifier circuit and more particularly to a circuit effective to produce a potential output pulse of a predetermined constant time duration, in response to a trigger input pulse and irrespective of applied input potentials following the trigger input pulse.

In certain applications, it is desirable or even necessary to produce a potential pulse of a certain width in response to an applied potential of at least a certain magnitude. It therefore follows that the circuit producing the potential pulse must be insensitive to applied input potentials once the production of the desired output pulse is initiated.

A well-known circuit for producing a desired output pulse of a predetermined width in response to the application of a potential of a certain magnitude is the monostable multivibrator. In this circuit a pair of active circuit devices, which may be electron tubes or transistors, have respective input and output elements cross coupled and are biased in such a manner that in a quiescent condition of the circuit one of the devices, is in a state of high conduction and the other of the devices is in a state of very low conduction. The cross coupling between these devices has a time constant circuit which may include a resistor and a capacitor which is charged through the resistor. The circuit may be triggered by a pulse applied to an appropriate node of the circuit so as to either charge or discharge the capacitor through the resistor of the time constant circuit and this period of time determines the transient condition of the circuit. During this transient condition the transistor previously in a state of high conduction is in a state of low conduction and the transistor previously in a state of low conduction is in a state of high conduction. On the completion of a predetermined amount of either charge or discharge of the capacitor in the time constant circuit the multivibrator circuit reverts automatically to its quiescent condition and is thus ready to receive another input pulse to undergo another transition to its transient condition and reversion to its quiescent condition.

While this circuit has been applied with admirable success for the purpose of producing output pulses of a predetermined duration in response to the application of triggering pulses of a predetermined magnitude the same have been susceptible to extraneous influences such as noise which may occur in the circuitry involved for interrupting or shortening the transient period of the circuit. As a consequence circuits following the monostable multivibrator and relying upon the multivibrator for reliable pulses of a predetermined time duration are improperly excited resulting in erroneous operation or no operation at all.

In the usual multivibrator circuit of the type herein described, the input active circuit device is maintained in either a state of high conduction or low conduction by a biased potential derived from the output of another circuit device. In the usual case this biasing potential is of considerably greater magnitude than is required for the purpose of maintaining the input active circuit device in its quiescent condition. Thus an input trigger pulse of considerable magnitude is required to trigger the circuit into its transient condition. While in most cases this is not an adverse feature since pulses of considerable magnitude are available, in certain applications the input pulses received may desirably be of relatively small magnitude. In this case it would be undesirable to require the input pulse to surmount the magnitude of the biasing pulse from the output circuit of the other active circuit device for triggering the circuit into its transient condition.

It is accordingly a principal object of this invention to provide a monostable multivibrator circuit which is responsive to input pulses of relatively small magnitude and which further is insensitive to extraneous potentials produced, as by noise, for producing an output potential of a predetermined pulse width in response to application of input pulses to the circuit.

In accordance with this invention the output potential of a multivibrator circuit utilized for biasing the input active circuit device to its quiescent condition is isolated therefrom by means of a unidirectional circuit element after the circuit has made its transition from its transient condition to its quiescent condition. Thus, the active circuit element at the input of the circuit is influenced only by the input trigger pulses and no longer by the output potential of the other active circuit device in the multivibrator circuit.

The foregoing and other objects, features and advantages of the invention will be apparent from the following more particular description of a preferred embodiment of the invention, as illustrated in the accompanying drawings.

Figure 2:
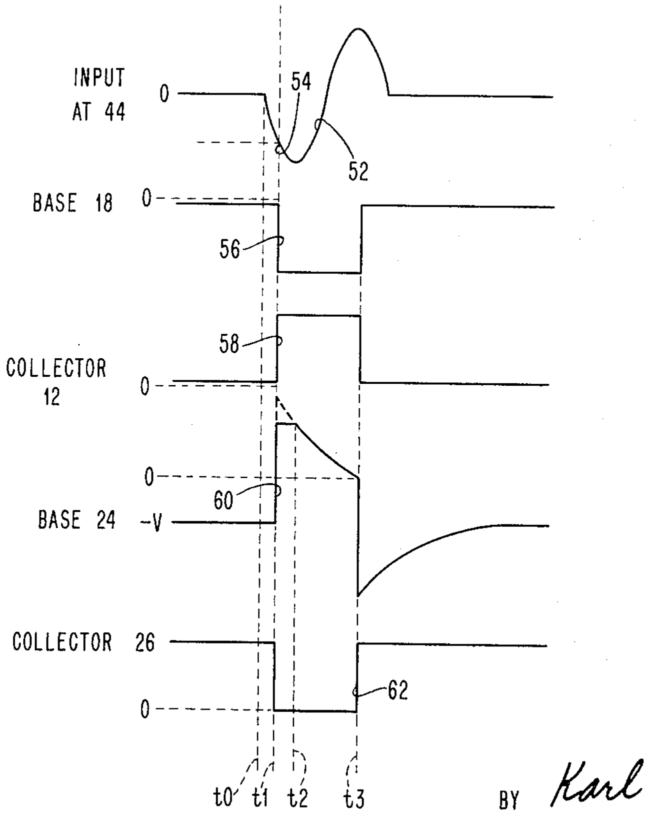

FIGURE 1 is a schematism of monostable multivibrator utilizing features of the present invention, and FIGURE 2 shows wave forms of potentials at certain nodes of the circuit shown in FIGURE 1.

Referring now to the drawings for a more detailed description of the invention, in FIGURE 1, 10 represents generally a monostable multivibrator circuit which includes as active circuit devices respective transistors 12 and 14 which are shown as being of the NPN junction type. Transistor 12 has an emitter 16, base 18, and collector 20; and transistor 14 includes an emitter 22, base 24, and collector 26. The collector 20 of transistor 12 is coupled to base 24 of transistor 14 through a capacitor 28 and the collector 26 of transistor 14 is coupled to the base 18 of transistor 12 through a resistor 30 and a serially connected unidirectional diode 32 having its anode connected directly to base 18 and its cathode connected to resistor 30. Base 18, collector 20, and collector 26 are all positively biased from a source of potential positive with respect to ground through respective resistors 34, 36, and 38 connected between this source of potential and these respective elements. The junction between resistor 30 and diode 32 and the base 24 of transistor 14 are negatively biased by a source of potential negative with respect to ground connected to these respective points through respective resistors 40 and 42. The emitters 16 and 22 are each connected to ground as shown. For the purpose of applying input potential pulses to the monostable multivibrator circuit an input terminal 44 is provided and is connected to base 18 through a capacitor 46 in series with a resistor 48. Output potentials from the circuit 10 are derived from an output terminal 50 connected directly to collector 26.

In the absence of input potentials applied at input terminal 44 and in response to the application of potentials represented by the symbols +V and −V, the circuit assumes a quiescent condition in which transistor 12 is in a state of saturation, or in other words, heavy conduction and transistor 14 is in a state of very low conduction substantially at cutoff. It is noted that this condition results from the forward bias established at the junction between base 18 and emitter 16 by the positive potential applied to base 18 through resistor 34 and the negative potential applied to base 24 from the source of potential, —V, through the resistor 42. It is significant to note that the potential at the cathode of diode 32, which is at a point of a potential divider established by resistors 38, 30, and 40 across the sources of potential +V and —V, is positive with respect to ground by reason of the proportioning of resistor 40 relative to resistor 38 and 30. Thus, the diode 32 is reverse biased.

For an understanding of the circuit 10 shown in FIGURE 1 of the drawings reference is also made to FIGURE 2 of the drawings showing wave forms of potentials at certain nodes of this circuit. A typical input potential is represented by the wave form 52. This potential may be supplied, for example, by a magnetic reading head which reads a bit of information from a magnetic tape. As shown, this potential decreases from a time *t0* to a point 54 at time *t1*. At this time the potential at base 18 of transistor 12 is reduced to the point that the base-emitted junction of this transistor is reverse biased and conduction in the transistor is interrupted. The potential at base 18 is represented by wave form 56 and as shown, this potential drops abruptly from substantially zero volts to a very low value. This high reverse bias potential is supplied by the potential sourse —V through the voltage divider circuit of resistors 40 and 30. Since the base-emitter current is intrrupted, the emitter-collector current is also interrupted in this transistor whereby the collector potential suddenly rises to a value of substantially +V. This is represented by the wave form 58 in FIGURE 2.

The collector 20 of transistor 12 is coupled to the base 24 of transistor 14 through capacitor 28 whereby the positive pulse established at collector 20 is applied to the base 24. The result of this application of this potential pulse is to bias the base-emitter junction of transistor 14 in a forward direction whereby the current therein suddenly rises to a very high value. This is represented by the wave form 60 in FIGURE 2 of the drawings. The sudden rise of current in transistor 14 produces a negative pulse at its collector and this negative pulse is applied through resistor 30 and diode 32 to the base 18 of transistor 12. The negative pulse appearing at the collector 26 of transistor 14 is represented at 62 in FIGURE 2 of the drawings. During the transient interval of time from *t1* to *t3*, the base 18 of transistor 12 is biased negatively from the potential source, —V, applied through resistor 40 and diode 32 to maintain this transistor insensitive to spurious potentials that may be applied to input terminal 44. It is thus observed that the action initiated by the potential wave form 52 is regenerative and thus transistor 12 assumes a state of very low conduction near cutoff and transistor 14 assumes a condition of current saturation. This is the transient condition of the circuit 10. During the transient condition, capacitor 28 is charged through a series circuit including the base-emitter junction of transistor 14, the capacitor 28 itself, and resistor 36. The voltages produced during the charging of the capacitor 28 are shown on wave form 60. It will be noted that the high surge between times *t1* to *t2* saturates the components in the preferred embodiment shown, but that the well known exponential curve then appears to provide biasing current until the potential at base 24 drops to zero. At time *t3* the base-emitter junction of transistor 14 becomes reversely biased and current flow in this transistor becomes interrupted. The sudden drop in potential at base 24 is represented on wave form 60 at time *t3*. The negative potential feedback from collector 26 to base 18 of transistor 12 is also interrupted. Thus, the influence of potential source +V is to apply a positive potential to the base 18 of transistor 12 through resistor 34. Accordingly, transistor 12 reverts to a state of saturation conduction. This, again, is the quiescent state of the circuit 10.

In the quiescent condition of circuit 10, resistors 34 and 48 co-operate with transistor 12 and potential source +V to provide a discriminator circuit effective to minimize the adverse effects of noise introduced on line 44. To this end, the base-emitter junction of transistor 12 conducts a predetermined value of current and the base 18 is substantially at ground potential. Under these circumstances, resistor 34 is proportioned with respect to potential +V, to supply a value of current considerably in excess of this predetermined value. Thus noise signals introduced on line 44 which produce current conduction into capacitor 46 must reach a value so as to cause a conduction of current through resistor 48 greater than the value of excess current that resistor 34 and potential, +V, can provide over the value of current conducted through the base-emitter junction of transistor 12. Purely as an example, the base-emitter junction may conduct a current of the order 140 microamperes and of the order of 800 microamperes can be supplied from source, +V, through resistor 34. Thus the difference, or in other words approximately 660 microamperes, can flow through resistor 48 before the conduction in the base-emitter junction of transistor 12 can be significantly affected to change the condition of conduction in this transistor. Stated otherwise, the input noise pulses can be absorbed or discriminated against to the extent that they cause conduction of 660 microamperes through resistor 48.

In accordance with a feature of this invention provision is made so that the input signal pulses as represented on wave form 52 need only surmount this discriminator bias current in order to trigger the circuit 10. That is to say, the potential appearing at collector 26 in the quiescent condition of the circuit 10 is not applied to base 18 since this base is isolated from this collector by reason of the reverse bias on diode 32 in these circumstances. This is significantly different from the usual case of monostable multivibrators wherein the input pulse must be great enough to overcome this collector potential bias.

From the foregoing description it is apparent that in accordance with this invention a monostable multivibrator circuit is provided which is substantially immune from the adverse effects of noise on the input line and which is effective for producing an output pulse of a predetermined width in response to input signal potentials of at least a predetermined magnitude.

While the invention has been described with respect to a circuit utilizing NPN junction type transistors as active circuit devices, it is to be noted that it is equally applicable to circuits utilizing other types of transistors or even electron tubes as active circuit devices. Of course, in each situation appropriate changes of potential polarity and orientation of diode 32 must be made as will be readily understood by one skilled in the art.

While the invention has been particularly shown and described with reference to a preferred embodiment thereof, it will be understood by those skilled in the art that various changes in form and details may be made therein without departing from the spirit and scope of the invention.

What is claimed is:

1. A circuit to produce an output pulse of predetermined time duration comprising:

a first active element having an input and an output, and connected to be normally in a first state of conduction, means to connect a source of input pulses to the input of said first active element so that said first active element will be biased to a second state of conduction by each of said pulses, a voltage divider circuit having a first voltage division branch with two terminals and a second voltage division branch with two terminals, one of said terminals of said first voltage division branch and one of said terminals of said second voltage division branch being electrically connected, the connection of said two voltage division branches defining a voltage division point and the terminals of said two voltage division branches electrically away from said connection defining a first end and a second end of said voltage divider circuit, said voltage division point being connected to the input of said first active element, a second active element having an input and an output, the output of said second active element being connected to the said end of said voltage divider circuit terminating said first voltage division branch, said second active element being connected to normally conduct at one state of conduction and to conduct in a changed state of conduction in response to a signal at its input, a unidirectional device connected in series circuit with said first voltage division branch between the output of said second active element and the input of said first active element, said unidirectional device being poled to be normally back biased and being normally back biased when said second active element is in its normal state of conduction, a voltage source connected to the said end of said voltage divider circuit terminating said second voltage division branch poled to bias said first active element to said second state of conduction, a circuit including an electrical energy storing element for establishing a time constant connecting the output of said first active element and the input of said second active element, said first active element being connected to produce a signal when in said second state of conduction which will pass said circuit for establishing a time constant for a predetermined time substantially equal to said predetermined output pulse time duration to bias said second active element to a changed state of conduction at which the output of said second active element changes to a value at which a forward bias will be presented to said unidirectional device to positively bias said first active element against change in state of conduction.

2. The circuit as in claim 1 in which said unidirectional device is connected betwen the input of said first active element and said voltage division point.

3. A circuit to produce an output pulse of predetermined time duration comprising:

a first transistor having an emitter, a base, and a collector, and connected to be normally in a first state of conduction, the emitter of said first transistor being connected to a predetermined plane of potential, means to connect a source of input pulses to the base of said first transistor so that said first transistor is biased to a second state of conduction by each of said pulses, a first circuit comprising a resistor and having two ends, a second circuit comprising a resistor and having two ends, a voltage source poled to bias said first transistor to said second state of conduction connected to one of said ends of said first circuit comprising a resistor, the other of said ends of said first circuit comprising a resistor being connected to one of said ends of said second circuit comprising a resistor, a second transistor having an emitter, a base, and a collector, the collector of said second transistor being connected to the remaining one of said ends of said second circuit comprising a resistor, said second transistor being connected to normally conduct at one state of conduction and to conduct in a changed state of conduction in response to a signal at its base, the emitter of said second transistor being connected to a predetermined plane of potential, means connecting said one end of said second circuit comprising a resistor to the base of said first transistor, a diode connected in series circuit with said second circuit comprising a resistor between the collector of said second transistor and the base of said first transistor, said diode being poled to be normally back biased and being normally back biased when said second transistor is in its normal state of conduction, a circuit including a capacitor for establishing a time constant connecting the collector of said first transistor to the base of said second transistor, said first transistor being connected to produce a signal when in said second state of conduction which will pass said circuit for establishing a time constant for a predetermined time substantially equal to said predetermined output pulse time duration to bias said second transistor to a changed state of conduction at which the output of said second transistor changes to a value at which a forward bias will be presented to said diode to positively bias said first transistor against change in state of conduction.

4. The circuit as in claim 3 in which said diode is connected between the base of said first transistor and the point of connection of said other end of said first circuit comprising a resistor and said one end of said second circuit comprising a resistor.

No references cited.

ARTHUR GAUSS, *Primary Examiner.*